(12) United States Patent
Kurano

(10) Patent No.: US 6,236,307 B1
(45) Date of Patent: May 22, 2001

(54) VEHICLE LOCK AND ALARM

(75) Inventor: Yoshiaki Kurano, Iwata (JP)

(73) Assignee: Kabushiki Kaisha Aiaishi (JP)

( * ) Notice: Subject to any disclaimer, the term of this patent is extended or adjusted under 35 U.S.C. 154(b) by 0 days.

(21) Appl. No.: 09/391,182

(22) Filed: Sep. 8, 1999

(30) Foreign Application Priority Data

Sep. 11, 1998 (JP) .................................................. 10-257880

(51) Int. Cl.$^7$ .................................................. B60R 25/10
(52) U.S. Cl. ........................ 340/426; 340/427; 340/432
(58) Field of Search .................................... 340/426, 432, 340/427; 70/238, 209, 225, 226, 233, 38; 296/78.1

(56) References Cited

U.S. PATENT DOCUMENTS

| | | | |
|---|---|---|---|
| 3,879,721 | * 4/1975 | Yereance | 340/427 |
| 4,641,124 | * 2/1987 | Davis | 340/64 |
| 4,811,578 | * 3/1989 | Masoncup et al. | 340/542 |
| 5,124,565 | * 6/1992 | Yoshida et al. | 307/9.1 |
| 5,330,029 | * 7/1994 | Yoshimura et al. | 180/219 |
| 5,408,212 | * 4/1995 | Meyers et al. | 340/427 |
| 5,534,847 | * 7/1996 | McGregor | 340/432 |
| 5,539,378 | * 7/1996 | Chang | 340/542 |
| 6,028,507 | * 2/2000 | Banks et al. | 340/427 |
| 6,060,982 | * 5/2000 | Hotrop | 340/432 |

* cited by examiner

Primary Examiner—Daniel J. Wu
Assistant Examiner—Son Tang
(74) Attorney, Agent, or Firm—Bacon & Thomas PLLC

(57) ABSTRACT

A vehicle alarm system for use with a lock (1) that is attachable to a vehicle wheel (2). The alarm system includes a lock motion detection sensor (20) and a transmitter (15) to transmit signals from the detection sensor. The motion detection sensor and the transmitter are located inside the lock. The vehicle includes a receiver (24) that receives the detection signals sent by the transmitter (15), an alarm (4) that emits a warning sound, and an operations control unit (25) that sounds the alarm in response to the signal from the receiver. The control unit and alarm are powered by the vehicle's battery (7).

23 Claims, 5 Drawing Sheets

VEHICLE LOCK AND ALARM

BACKGROUND OF THE INVENTION

1. Field of the Invention

The present invention relates to locks which can be attached to vehicles such as motorcycles. More specifically, it relates to locks that incorporate an alarm system.

2. Related Art

In the prior art, locking devices have been attached to wheels of motorcycles and the like to prevent theft, including locks that were equipped with an alarm which would sound when the lock was moved. FIG. 6 is a simplified diagram of a conventional lock equipped with such an alarm. As is shown in the figure, when closed, the lock forms a U-shaped ring, and when it is installed around a vehicle wheel (not shown), the lock immobilizes the vehicle. After the vehicle has been parked, the approximately U-shaped shackle or bar 31 is attached through the inside of the wheel and then the left and right ends of the bar are inserted into a locking member body 32 located outside of the wheel. This locking member 32 is equipped with a sensor, alarm, and electronic parts to control them located inside a housing member 33. When the alarm is set, if the sensor detects any vibration, tilt or other motion of the lock, an alarm is sounded to deter theft.

However, such locks of the prior art attach or include the alarm to or with the lock itself, and breaking the lock may destroy the alarm, or, the alarm can be covered with cloth to mute its volume and thereby reduce its ability to deter theft.

Further, since the alarm must emit sound as a warning, it is not possible to provide a completely sealed, waterproof structure. Accordingly, moisture can enter the locking device and may deteriorate the lock or produce operational failure.

In addition, because the alarm requires relatively high electric power to operate and since there is limited space available inside the lock for housing the power source such as batteries or the like for the alarm and sensor, there are limitations on the length of time the alarm can operate and upon the sound level it can generate.

Furthermore, since a housing member has to be attached to the lock to house the alarm, the size of the lock is thereby increased considerably.

The present invention was developed to address the above described issues in the prior art, and it has as its objective the provision of an alarm system for locks which will sound the alarm even if the lock is broken, which imposes no restrictions upon the alarm's time of operation or sound level, and which does not increase the size of the lock.

SUMMARY OF THE INVENTION

To achieve the foregoing objectives, this invention provides an alarm system for locks that may be attached to motor vehicle wheels and that comprise on the lock side, a lock motion detection sensor and a transmitter to transmit the results of the sensor's detection located inside the lock, and, on the vehicle side, a receiver to receive the detection signals sent by the transmitter, an alarm that emits a warning sound, and an operation control unit which sounds the alarm based upon the output from the aforesaid receiver, and further wherein the control unit and alarm are powered by the vehicle battery.

The alarm of this configuration is installed within a vehicle fairing enclosure, so it is difficult to observe from the vehicle exterior, making it less subject to being broken. Also, this configuration makes it possible to prevent the alarm being covered with cloth or the like to diminish its sound output. These measures enhance the prevention of vehicle theft. Also, because the alarm is not attached to the lock itself, the lock can be made to be more compact to facilitate its use, and its waterproofing can be enhanced.

Further, since the control unit and alarm use power from the vehicle's battery, they are assured of an adequate supply of power from that battery, so that almost no restrictions are imposed on the duration of sounding the alarm or on its volume.

Further, in preferred embodiments, the power source and the switch for the alarm transmitter are installed inside the lock, and the power source is turned ON and OFF when the lock key is locked and unlocked, while the power supply for the control unit is turned ON and OFF by turning the ignition key in the main ignition switch of the vehicle.

With such a design, the mere attaching of the lock to the parked vehicle powers the alarm to eliminate the possibility of forgetting to turn on the alarm and eliminating the bothersome task of setting the alarm after attaching the lock. Further, when the vehicle is transported with the lock installed, the main ignition switch can be turned ON during such transport to prevent sounding a false alarm even if the vehicle is subject to vibrations during transportation.

In preferred embodiments, a specific time delay is incorporated between the time the main switch of the vehicle is turned OFF and the time when the control device becomes operational, and between the time when the sensor detects motion and when the alarm is sounded.

Thus, if the lock is attached during the delay period that is incorporated between turning OFF of the main switch of the vehicle and the operation of the control unit, even if the sensor detects motion from the attachment of the lock, the alarm will not sound. Further, the delay between the detection of motion and the sounding of the alarm allows the lock to be removed without the alarm being operated, even if the sensor detects motion. Further, if the main switch is left ON before the lock is removed, no alarm will sound. These means allow the owner of the vehicle to attach the lock and remove it without sounding the alarm.

DETAILED DESCRIPTION OF PREFERRED EMBODIMENTS OF THE INVENTION

Figure 1:
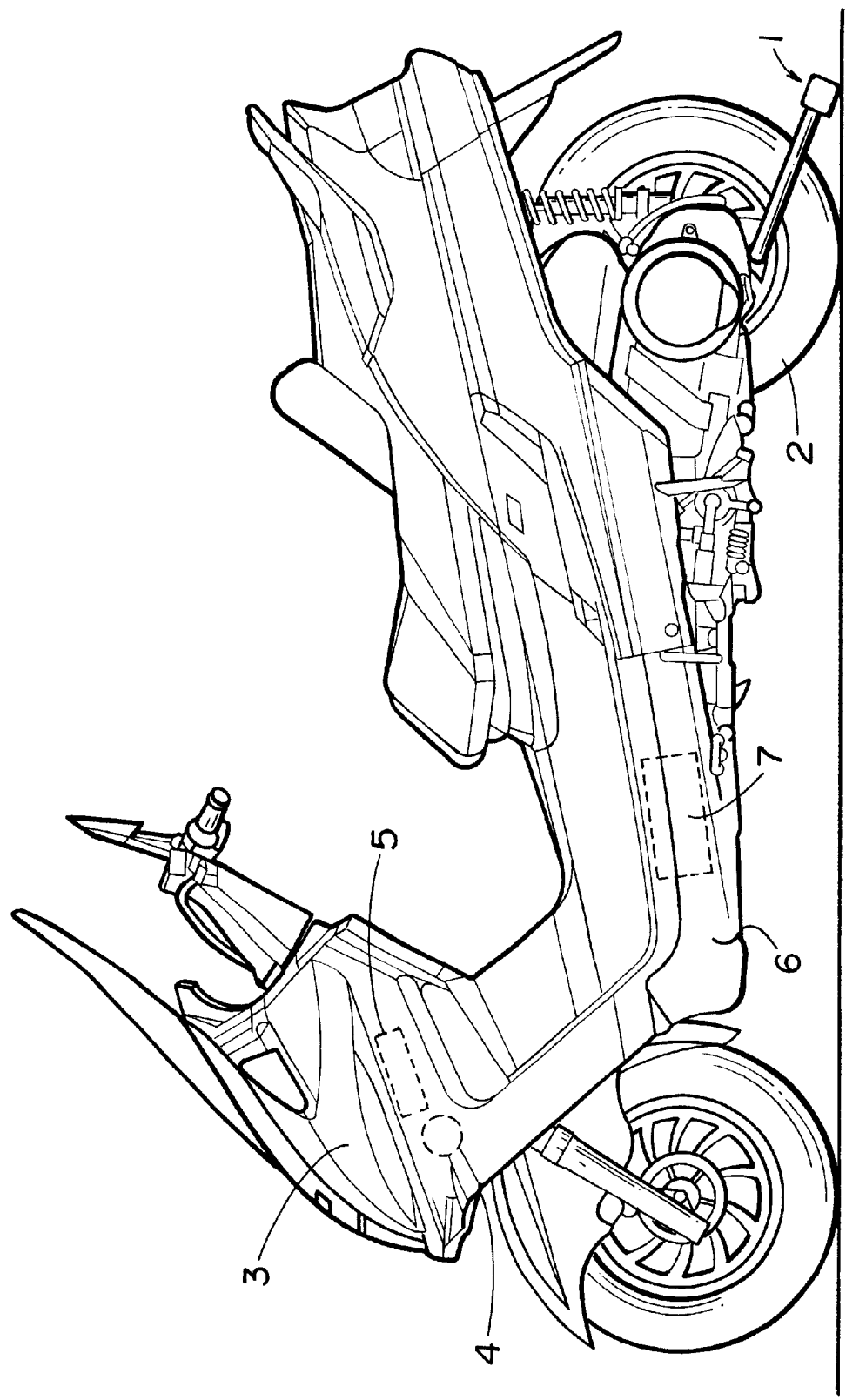
FIG. 1 is a view of a motorcycle to which a vehicle lock and alarm according to an embodiment of this invention has been attached.
Figure 2:
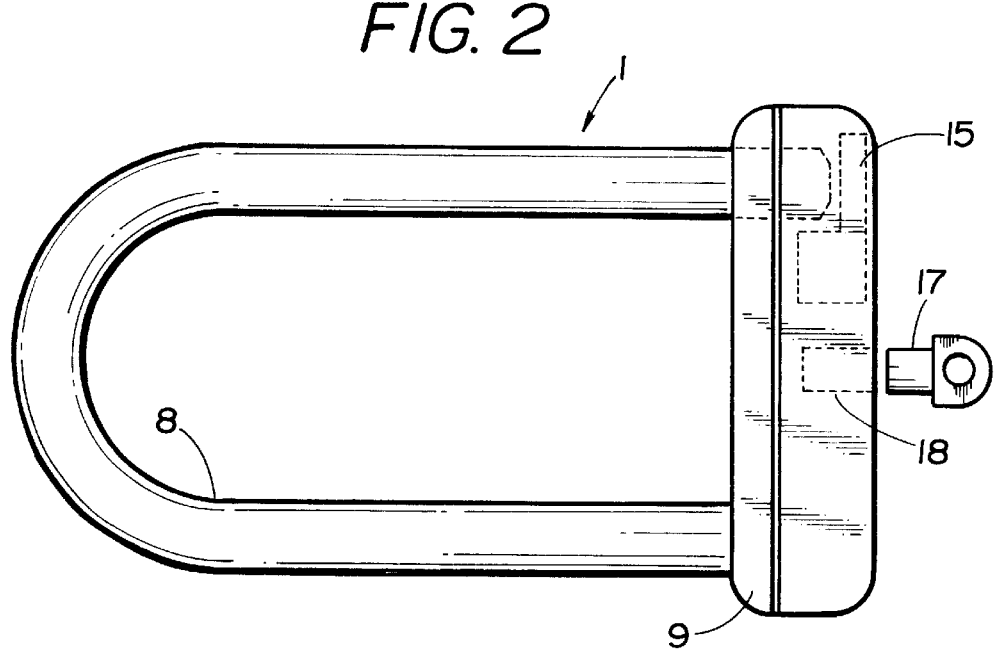
FIG. 2 is an exterior plan view of the lock of this invention

FIG. 1 shows an embodiment of a lock and alarm in accordance with this invention attached to a motorcycle. As shown in this figure, a padlock type lock 1 including a shackle or bar 8 (as shown in FIG.2) is attached to the wheel (rear wheel or driving wheel member) 2 to render it not freely rotatable. As will be described below, a conventional sensor that detects vibration or tilting of the lock and a transmitter of the type known to persons skilled in the art and that emits an alarm activating signal in response to motion detection are installed inside the lock. Preferably positioned within the vehicle fairing enclosure, there is an anti-theft alarm device 4 and a control unit 5 that operates the alarm device. As will be described below, the control unit 5 controls the power to the alarm device 4 based upon the receipt of an alarm activating signal by the receiver from the aforesaid transmitter. Thus, because it is easy to install the alarm device 4 in a place not visible from outside the vehicle, it is possible to avoid the breaking of the alarm device 4 during theft. Further, since the alarm device 4 is covered by the vehicle fairing 3, it is shielded from the rain, and protected from having its sound muted by wrapping with a cloth or the like. The vehicle battery 7, which is used to drive the starter motor to start the motorcycle engine, is located inside the vehicle cover 6 in the lower center part of the vehicle's body. This battery 7 provides the power source for the alarm device 4 and the control unit 5, and because of the high capacity of this vehicle-mounted battery 7, it imposes no restrictions upon the operational time or on the loudness of the alarm device 4.

Figure 3:
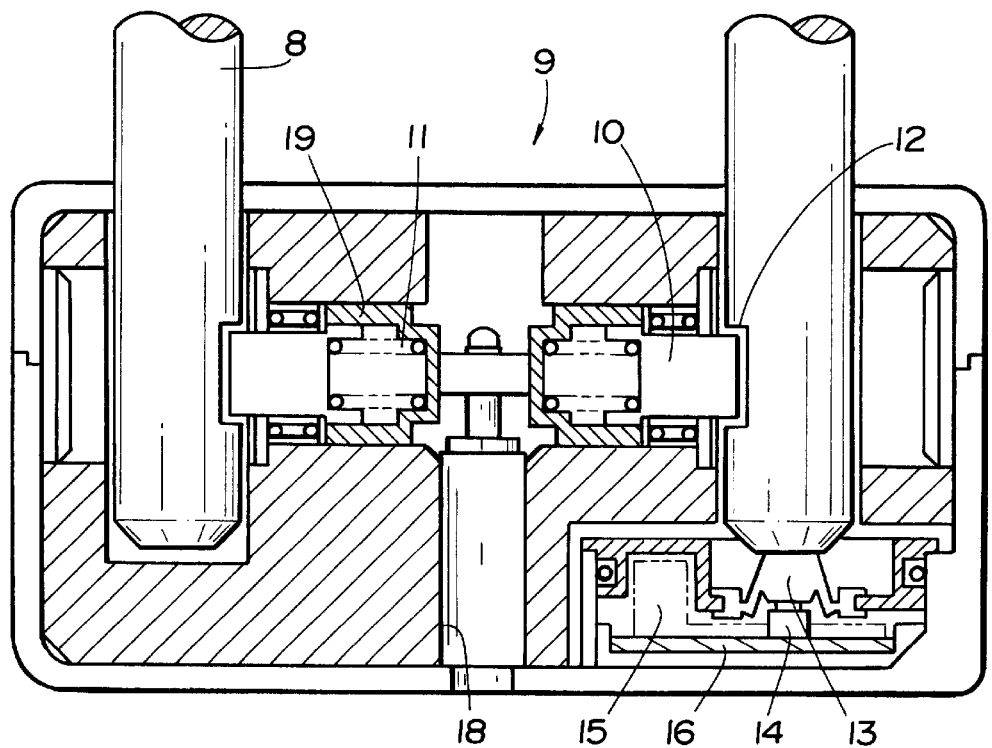
FIG. 3 is a sectional view of the principal parts of a lock according to this invention.

FIG. 2 shows an overall outside view of a lock according to this invention, and FIG. 3 shows a sectional view of the principal internal parts. The lock 1, which preferably comprises a closed U-shaped loop, is composed of an approximately U-shaped movable shackle or bar 8 connected to a locking member body 9. When attaching the lock 1 to the vehicle, the bar 8 is inserted through the inside the wheel and then its free ends are inserted from the outside into the locking member body 9. When inserting the bar 8 into the locking member body 9, the front end of a rod 10 disposed inside the body 9 is pushed toward the center of the body 9 against the resistance of a spring 11, and when the bar 8 has been inserted to the required position, the spring 11 causes a locking notch 12 to be engaged by the bar 8. The engagement of the rod 10 in the notch 12 locks the shackle 8 in place in body 9 in a locked relationship.

Further, an actuator 13 that makes contact with one end of the inserted bar 8 is installed inside the locking member body 9, and pressing the actuator 13 by one end of the bar 8 causes a power supply switch 14 to be turned ON. This power supply switch 14 is mounted on a printed circuit board 16 along with a conventional sensor (not shown) that detects vibrations or other movements, and a transmitter circuit (not shown) including a transmitter 15 that transmits alarm activating signals to the receiver, and various electronic components. The power source for these is a battery 22 (FIG. 4) carried by the body 9. This transmitter 15 emits an alarm activating signal to the vehicle-mounted receiver when the sensor in the lock detects motion such as vibrations or tilting.

To remove the lock 1 from the wheel, a key 17 is inserted into the key cylinder 18, and then the rotation of that key causes the sleeve 19 to move toward the center of the locking member. This action further causes the rod 10 to move toward the center of the locking member to allow the bar 8 to be moved and released relative to body 9. As a result, the actuator 13 is separated from the switch 14 which then automatically cuts off the power supply to the transmitter 15. This structure eliminates the bothersome task of turning off the power to the transmitter 15 after removing the lock 1.

Figure 4:
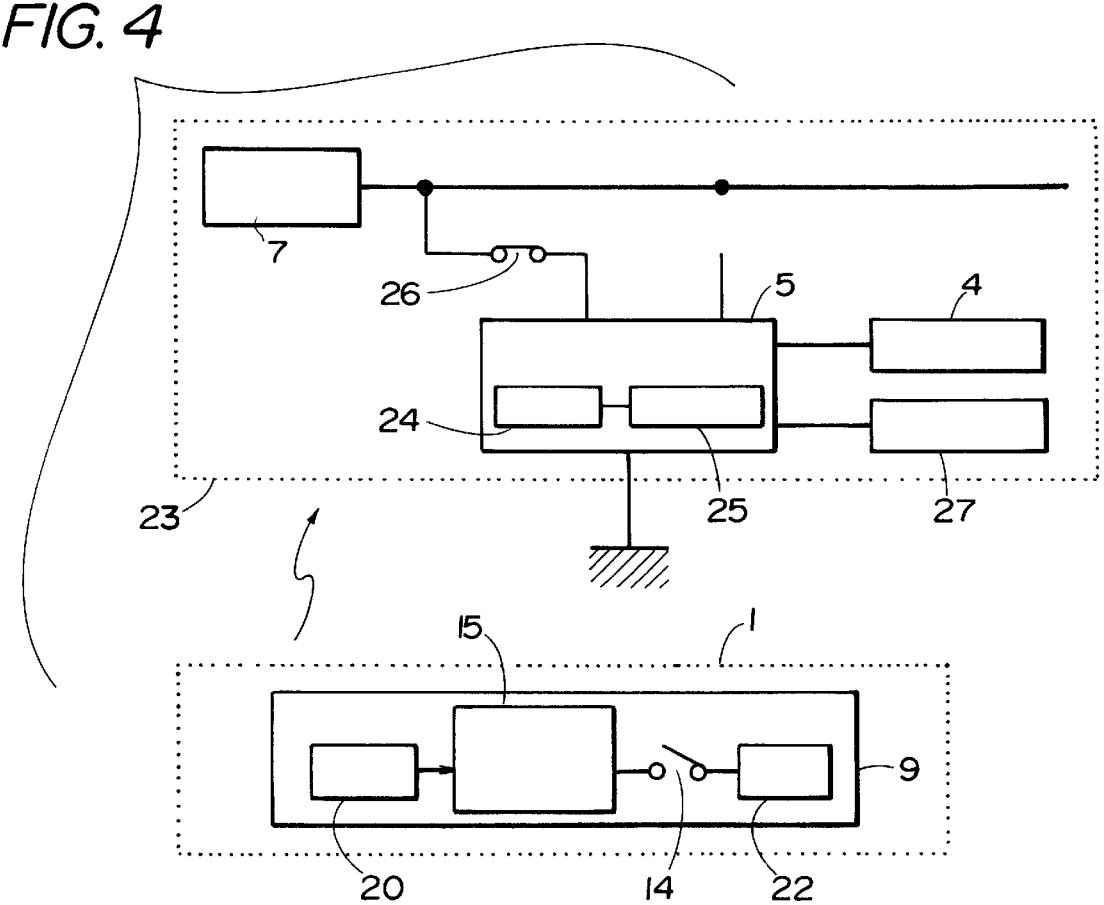
FIG. 4 is a schematic diagram of the lock and alarm according to this invention.
Figure 6:
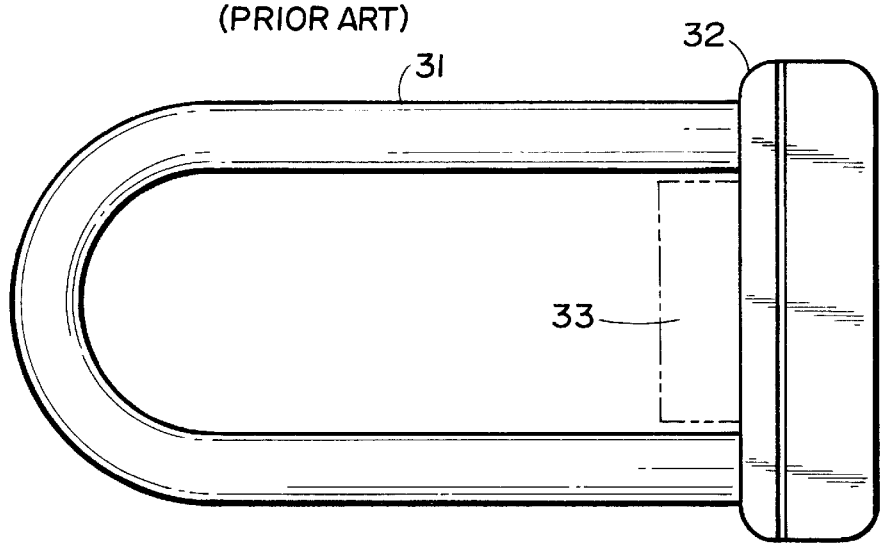
FIG. 6 is a diagram of a conventional vehicle lock with an alarm.

FIG. 4 is a functional block diagram of the alarm system for locks according to this invention. As was described above, a motion signal generated by the sensor 20 powered by a battery 22 inside the lock body 9 is sent by a transmitter 15 in a transmitter circuit to a receiver 24 that is incorporated in a control unit 5 mounted inside the vehicle fairing 23. The control unit 5, which is powered by the vehicle mounted battery 7, is connected to an alarm device 4 and an operation indicator 27. This control unit 5 is controls of an alarm device 4 that is operated in response to a signal generated by the receiver 24 when an alarm activating signal is transmitted from the lock 1 by the transmitter 15 to the receiver 24, and includes a control device 25 that controls the operation of the operation indicator 27. As will be described below, the control unit 5 is designed to automatically power the alarm after a delay period following turning OFF the main switch 26 of the vehicle 23. The operational indicator 27, consists of an LED or the like, and displays the ON/OFF arming status of the alarm. The alarm 4 and the operational indicator 27 are powered by the vehicle mounted battery 7. The control unit 5, alarm device 4, receiver 24 and indicator 27 may be referred to herein as an alarm unit.

Figure 5:
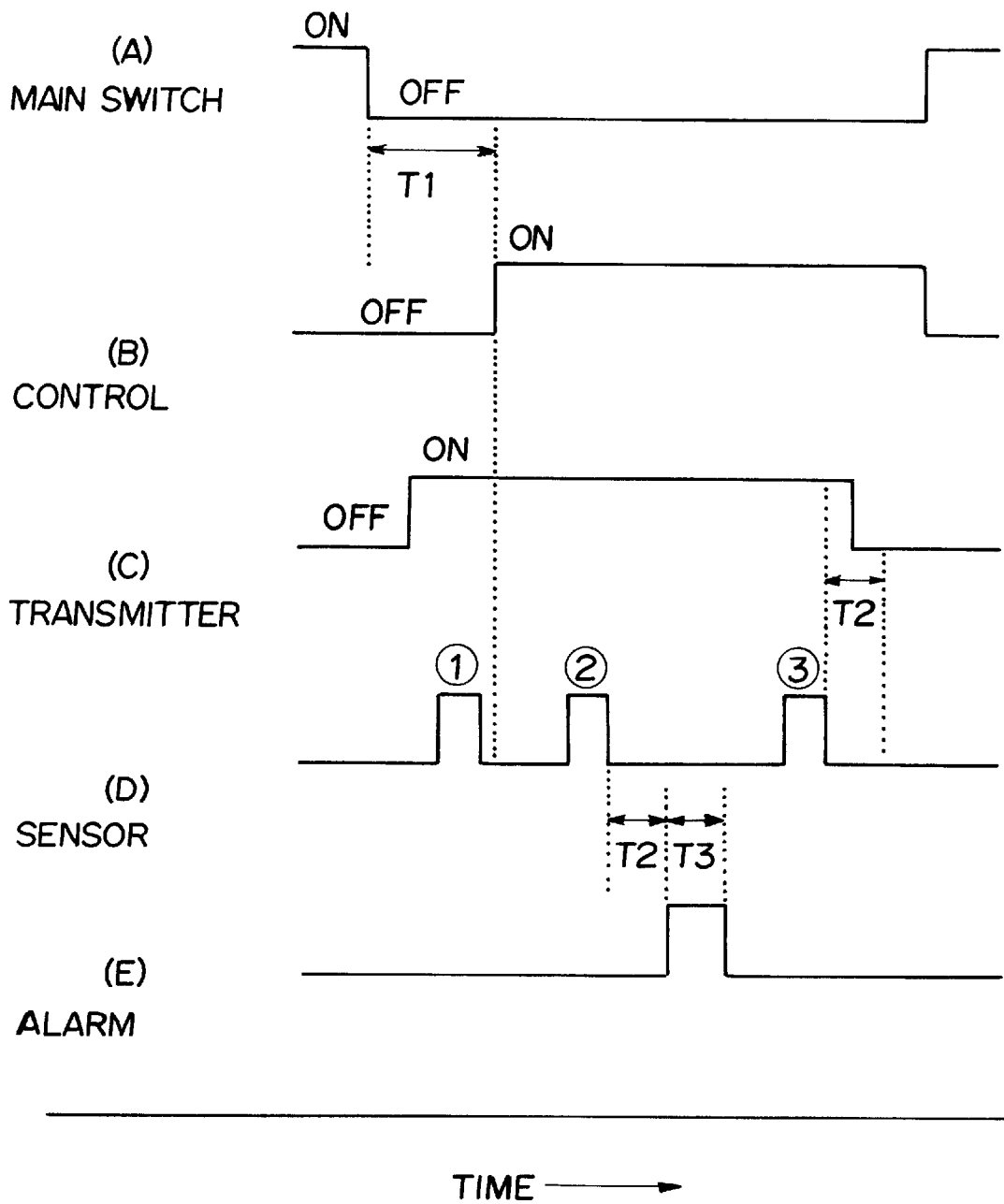
FIG. 5 is a time plot showing the operational conditions for the lock and alarm according to this invention.

FIG. 5 shows a time plot of the operational mode of the alarm system used in locks according to this invention. As shown in (A), when the vehicle main switch (ignition switch) 14 is turned OFF, the delay circuit in the control unit 5 turns on the power control unit after the time delay T1 as shown in (B). If the main switch is turned ON, the power to the control unit is immediately cut. As is shown in (C), the transmitter 15 in the lock is energized directly when bar 8 is in the locked position, while unlocking with the key 17 opens switch 14 and cuts the power. As shown in (D), when the sensor 20 detects motion, a pulse motion signal is generated. This pulse signal from the sensor is then transmitted from the transmitter to the receiver, which, as shown in (E) causes the control unit to sound the alarm after a specific time delay T2 . The delay time T2 can be set by using a delay circuit inside the transmitter or the receiver. It is further possible to set the time T3 over which the alarm will sound. The setting of this time T3 helps conserve the power of the vehicle mounted battery.

When the owner of the vehicle turns OFF the main switch 14 and attaches the lock, the resulting movement of the lock is detected by the sensor 20, but because of the time delay T1 before the control unit is turned ON, the alarm does not sound. This feature makes it possible to prevent the owner from sounding the alarm while attaching the lock by setting the time delay T1 appropriately, according to how long it takes to attach the lock.

After the time delay T1 has expired, the control unit is turned ON, and at this time, the motion detected by the sensor triggers the sounding of the alarm after a second time delay T2 has elapsed.

When the owner wants to remove the lock from the vehicle, raising the lock produces vibrations that are caught by the sensor, but, due to the time delay T2, the lock can be removed, which immediately cuts OFF the power source to the transmitter and the alarm does not sound. After that, turning ON the main switch of the vehicle causes the automatic cutoff of the switch for the controller. At this time, it is also possible to first turn ON the main switch before removing the lock from the wheel, thereby avoiding a false alarm.

The control device of this invention may also be operated by remote control or other known ways besides the main switch of the vehicle. In that case, the vehicle may be left with the lock attached, and the power to the lock apparatus can be switched off with the remote control to prevent a false alarm when adding oil or performing other operations that require the main switch to be OFF.

The transmitter used in this invention may be installed in any number of places aside from in the lock, and it can be removably attached to the lock. Attaching the transmitter to the vehicle prevents vandalism to the vehicle, and by removing it from the lock and attaching it to for example, motorcycle bags or luggage, theft of such accessories or luggage can be prevented.

As described above, this invention attaches the alarm within the vehicle where it cannot be seen, to help protect it from being broken or being rendered less effective by wrapping it with cloth, etc. These measures deter vehicle theft. Further, the locking device is compact and easy to use, and can be made to be highly waterproof. Further, since both the control unit 5 and the alarm 4 are powered by the vehicle battery 7, there are almost no limitations imposed by this adequate power source on the duration of the alarm operation or its volume.

Figure 7:
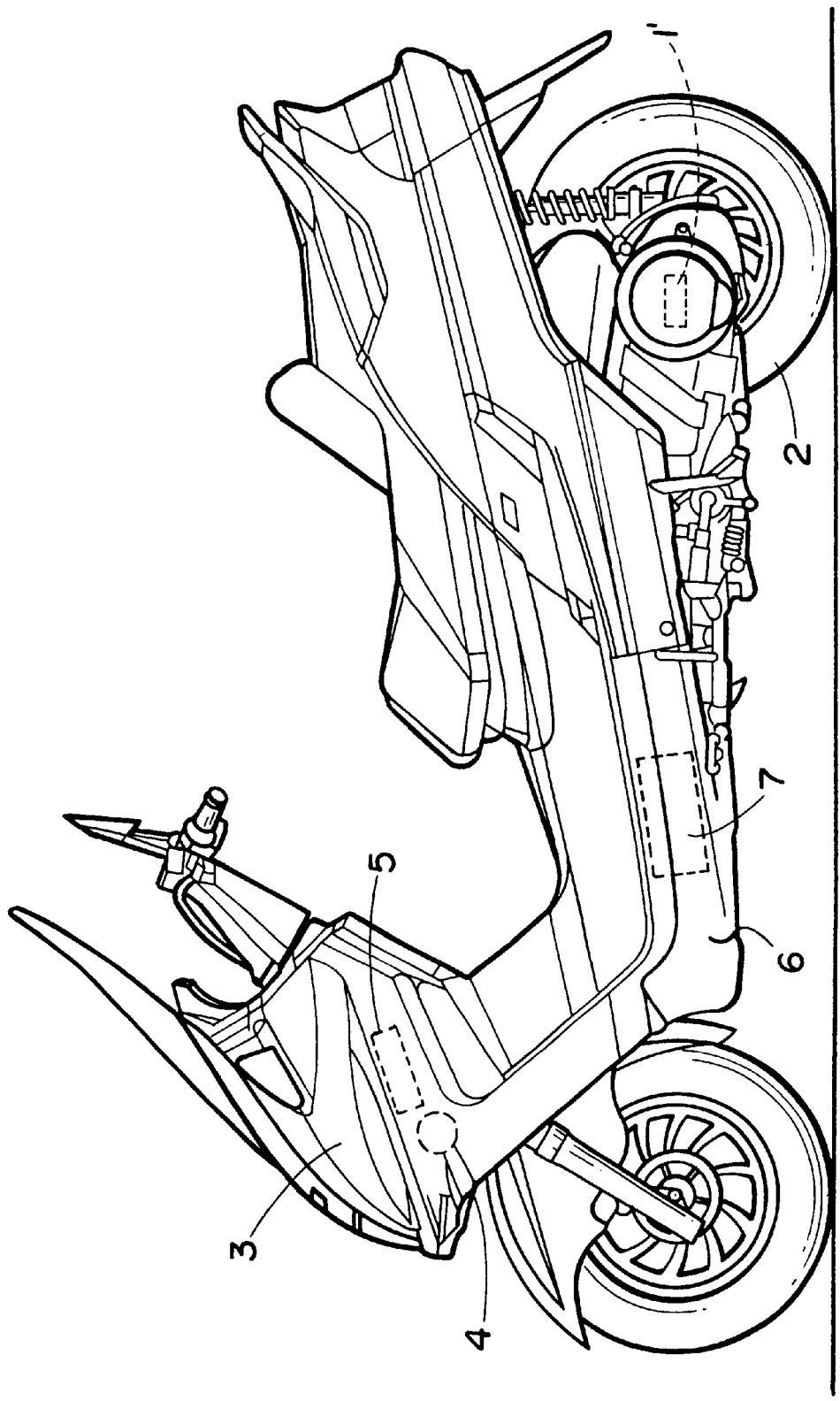
FIG. 7 shows an alternate form of the invention.

In accordance with an alternate embodiment of the invention, as illustrated in FIG. 7, the locking device of the invention may be non-removable from the vehicle and may be associated with a movable portion of the vehicle to selectively limit movement of such movable portion relative to another member of the motorcycle, such as illustrated by the locking means 1' illustrated in FIG. 7, the lock 1, incorporates a sensor 20, battery 22 and transmitter 15 in a manner similar to the locking means 1 described previously. A power switch 14 could be incorporated with the lock 1' to be operated by a key 17 and key cylinder 18.

While in accordance with the preferred embodiment, a wireless type transmitter 15 is preferred, it will be understood that the transmitter 15 may communicate a signal responsive to sensor 20 detecting motion by a wire. Wireless transmitting and receiving arrangements including radiant energy (radio frequency, infrared, etc.) acoustics and light beam transmission, for example could be used.

While preferred embodiments of the invention have been described herein, it will be understood that the invention may be modified in accordance with principles and techniques known to those skilled in the art without departing from the spirit and scope of the invention as defined in the claims that follow.

What is claimed is:

1. A lock and alarm system for a moveable device having a first moveable element and a second element, the system comprising:
    a lock including a securing member arranged to immobilize a first moveable element against free movement relative to a second element, said lock including a body portion engageable to the securing member;
    a motion sensor carried by the body portion and arranged to detect motion of the lock and generate a motion signal upon the detection of motion of the lock;
    a transmitter carried by the body portion and arranged to receive the motion signal from the motion sensor and transmit an alarm activating signal responsive to said motion signal;
    an alarm unit located remotely from said lock and attached to the moveable device, said alarm unit including a signal receiver arranged to receive the alarm activating signal transmitted by said transmitter, said alarm unit including an alarm device, said alarm unit arranged to activate said alarm device in response to receiving the alarm activating signal by said signal receiver.

2. The lock and alarm system as claimed in claim 1, wherein said securing member comprising an open loop shackle member closable in a locked condition by said body portion, said body portion configured to be selectively separable from said loop shackle member when the lock is in an unlocked condition.

3. The lock and alarm system as claimed in claim 2, wherein said transmitter is electrically energizable and including an electric power supply in communication with said body portion, said body portion including a securing member position responsive power supply switch actuatable by said loop shackle member engaging said body portion in a locked condition, said power supply switch controlling activation of at least said transmitter by said power supply.

4. The lock and alarm system as claimed in claim 1, wherein said transmitter is electrically energizable, and includes a power supply arranged to energize at least said transmitter.

5. The lock and alarm system as claimed in claim 4, wherein said body portion includes a securing member position responsive power supply switch actuatable by said securing member engaging said body portion in a locked condition, said power supply switch controlling energization of at least said transmitter by said power supply.

6. The lock and alarm system as claimed in claim 5, wherein said motion sensor is electrically energizable and said power supply switch controls energization of said motion sensor by said power supply.

7. The lock and alarm system as claimed in claim 1, wherein said transmitter and said receiver are arranged to communicate with each other via wireless transmitted signals.

8. The lock and alarm system as claimed in claim 1 in combination with a moveable device, wherein the moveable device is a wheeled vehicle having an external enclosure portion, and said alarm unit is located within a component of said enclosure portion so as not to be readily visible from outside the external enclosure portion of the vehicle.

9. The lock and alarm system as claimed in claim 8, wherein the wheeled vehicle includes a battery power supply carried by the vehicle, and said alarm unit is connected for energization to said vehicle battery power supply.

10. The lock and alarm system as claimed in claim 8, wherein said vehicle is a motorcycle having an external fairing defining an enclosure, said enclosure portion of said vehicle comprising said fairing, and said first moveable element comprising a driving member of the motorcycle.

11. The lock and alarm system as claimed in claim 8, wherein said vehicle is a motorcycle, said motorcycle including a main ignition switch, said main ignition switch arranged to control energization of said alarm unit.

12. The lock and alarm system as claimed in claim 1, further including an electrical power supply in communication with said body portion, said transmitter and motion sensor being electrically energizable, and a power supply switch arranged for controlling energization of said transmitter and motion sensor by said electrical power supply.

13. The lock and alarm system as claimed in claim 12, wherein said first moveable element of said motorcycle comprises a driving member of the motorcycle, said securing member comprising an open loop shackle member closeable in a locked condition to said body portion, and said body portion configured to be selectively separable from said loop shackle member when the lock is an unlocked condition.

14. The lock and alarm system as claimed in claim 1, wherein said body portion including a first power supply arranged for energizing said transmitter and a power switch for controlling energization of the transmitter by the power supply; and a separate power supply for energizing said alarm unit positioned remotely from said body portion.

15. The lock and alarm system as claimed in claim 14, wherein said transmitter and receiver are arranged to communicate with each other via wireless transmitted signals.

16. The lock and alarm system as claimed in claim 14, wherein said power supply is arranged to energize said motion sensor and said first power supply switch is arranged to control energization of said motion sensor by said first power supply.

17. A vehicle lock and alarm system in conjunction with a motorcycle vehicle including an external fairing defining an enclosure, a battery power supply and a main ignition switch, said system comprising:

- a lock including a securing member having a locking position configured to immobilize a normally free moving member of the motorcycle against free movement relative to a normally non-free moving member of the motorcycle when the securing member is in a locked position, and a body portion engageable with the securing member to prevent release of the securing member from a locked position when the securing member and the body portion are in a locked together relationship;
- a motion sensor carried by the body portion and arranged to detect motion of the lock and generate a motion signal upon the detection of motion of the lock;
- a transmitter carried by the body portion and arranged to receive the motion signal from the motion sensor and transmit an alarm activating signal responsive to said motion signal;
- an alarm unit located remotely from said lock and within the enclosure of the motorcycle and out of view from outside the enclosure and including a signal receiver arranged to receive the alarm activating signal transmitted by said transmitter, said alarm unit including an alarm device, said alarm unit arranged to activate said alarm device in response to receiving the alarm activating signals received by said signal receiver;
- a power supply in communication with the body portion and arranged for energizing at least said transmitter;
- a power switch arrangement carried by the body portion and arranged for controlling energization of said transmitter by said power supply; and
- said ignition switch of the motorcycle arranged to selectively control energization of said alarm unit by said battery power supply of said motorcycle.

18. The vehicle lock and alarm system in conjunction with a motorcycle as claimed in claim 17, wherein said normally free moving member of the motorcycle comprises a wheel and said securing member comprises an open loop shackle member closable in a locked position by said body portion, said body portion configured to be selectively separable from said loop shackle member when the lock is in an unlocked condition.

19. The vehicle lock and alarm system in conjunction with a motorcycle as claimed in claim 18, wherein said power switch arrangement is configured at least in part to be actuated upon engagement between said shackle member and said body portion in a locked condition.

20. The vehicle lock and alarm system in conjunction with a motorcycle as claimed in claim 19, wherein said motion sensor is energized by said power supply and said power switch arrangement is configured to control energization of said motion sensor by said power supply.

21. The vehicle lock and alarm system in conjunction with a motorcycle as claimed in claim 17, wherein said transmitter and receiver are arranged to communicate with each other via wireless transmitted signals.

22. The vehicle lock and alarm system in conjunction with a motorcycle as claimed in claim 17, wherein said alarm unit comprises a control unit connected to said ignition switch of said motorcycle, a receiver and an alarm device, said control unit including a timer arranged to delay activation of said alarm device for a predetermined first time interval following receipt by said receiver of an alarm activating signal when the ignition switch is in an OFF position.

23. The vehicle lock and alarm system in conjunction with a motorcycle as claimed in claim 22, wherein said timer is arranged to delay said activation of said alarm device following generation of a motion signal by said motion sensor while the ignition switch is in an OFF position by a predetermined second time interval.

* * * * *